Patented Jan. 2, 1934

1,941,688

UNITED STATES PATENT OFFICE 1,941,688

CATALYTIC OXIDATION OF ORGANIC COMPOUNDS

Alphons O. Jaeger, Crafton, Pa., assignor, by mesne assignments, to The Selden Research & Engineering Corporation, Pittsburgh, Pa., a corporation of Delaware No Drawing. Application July 21, 1928
Serial No. 294,597

14 Claims. (Cl. 260—57)

This invention relates to the catalytic oxidation of organic compounds and more particularly to catalytic oxidations using a particular class of catalytic compositions.

In prior Patents No. 1,694,122, dated December 4, 1928; No. 1,735,763 dated November 12, 1929 and No. 1,722,297 dated July 30, 1929, processes have been described in which organic compounds have been catalytically oxidized, particularly in vapor phase, by means of contact masses containing as at least one of their constituents, when freshly prepared, base exchange bodies, silicious and non-silicious, and their reaction products with anions, the so-called salt-like bodies. It has now been found that the tremendous effectiveness of contact masses containing base exchange bodies is shared to a great extent by contact masses which contain acid leached base exchange bodies, that is to say products which are obtained by treatment of base exchange bodies with dilute acids, preferably dilute mineral acids such as dilute hydrochloric, sulfuric, nitric, and the like. This acid leaching treatment first gradually removes the exchangeable bases, then when carried further gradually removes the more basic portion of the non-exchangeable nucleus of the base exchange body and if carried to completion leaves only the acidic portion of the non-exchangeable nucleus. In the case of base exchange bodies containing silicon, i. e. zeolites, the final product is a complex silicic acid. In the case of non-silicious bodies, the final product of complete leaching contains only the relatively acid component or components of the non-exchangeable nucleus. Strange as it may seem, this leaching process does not appear to destroy to any large extent the highly porous physical structure of the base exchange bodies and to a considerable extent the effectiveness of the contact masses of the present invention may be ascribed to the fact that they possess a physical structure similar to the parent base exchange bodies from which they are prepared.

When the base exchange bodies themselves are catalytically active and the leaching in the case of zeolites is not to be carried to completion the leached body may contain catalytically active elements chemically combined therein. Where, however, the leaching is complete in the case of zeolites, the resulting complex silicic acid is not itself catalytically active but acts as an extraordinarily effective carrier for catalytically active components. The present invention includes the use of contact masses in which part or all of the catalytically active components may be present partly or wholly in the form of diluents physically associated, preferably in a homogeneous form, with the leached base exchange body.

The contact masses of the present invention should be carefully distinguished from salt-like bodies in which the anion entering into reaction remains chemically combined with the base exchange body forming therewith a complex exhibiting many of the properties of salts. The leaching with dilute acids which produces the contact masses of the present invention does not leave any notable quantity of the acid radical united with the base exchange body.

The base exchange bodies forming the raw materials for the contact masses used in the present invention may be either diluted or undiluted, preferably the former. Where a diluted base exchange body is leached, the diluents are usually, but not necessarily, unattacked and remain in intimate physical association with the leached base exchange body framework.

The diluted or undiluted base exchange bodies may be divided into two classes, zeolites, that is to say base exchange bodies containing silicon in their nucleus, and non-silicious base exchange bodies in which the silicon is completely replaced by suitable acid or amphoteric oxides, usually metal oxides.

The zeolites are of two general classes—two-component and multi-component zeolites. The two-component zeolites are the reaction products of two types of initial components, that is to say metallates and silicates (using the term metallates in a somewhat broader sense as will be defined further on in the description) or metal salts and silicates. Frequently more than one member of a type may enter into reaction, that is to say a silicate may react with more than one metallate or with more than one metal salt. Multi-component zeolites are the reaction products of at least three types of components, that is to say at least one silicate, at least one metallate and at least one metal salt.

Catalytically active components may be associated with diluted or undiluted base exchange bodies in four main forms, as follows:—(1) They may be physically admixed with or impregnated into the base exchange products leached or unleached. (2) They may be physically homogeneously incorporated into the base exchange products before the latter have been completely formed in the form of catalytically active diluent bodies or in the form of diluents which have been impregnated with catalytically active substances.

(3) They may be chemically combined with or in the base exchange products in non-exchangeable form, that is to say, they may form a part of the non-exchangeable nucleus of the base exchange body present in the final contact mass or which is transformed into the derivatives, or they may be chemically combined with the base exchange bodies in the form of catalytically active anions which form with the base exchange body or its leached derivative salt-like bodies.

(4) They may be chemically combined in exchangeable form either during the formation of the base exchange body or by base exchange after formation. Obviously, of course, the same or different catalytically active components may be present in more than one of the above described forms, and it is an advantage of the present invention that catalytically active substances may be introduced in a wide variety of forms which gives a large field of choice to the catalytic chemist.

While the different base exchange products may vary widely in their chemical characteristics, they all possess a similar physical structure which is characterized by more or less high porosity, frequently microporosity, and great resistance to high temperatures, and in the case of products which have not been acid leached to the point of removal of all catalytically active components these components are distributed throughout the framework of the products in atomic or molecular dispersion and this chemical homogeneity is one of the important advantages of some of the contact masses of the present invention.

While three of the methods of combination of the catalytically active substances may be effected with undiluted as well as diluted base exchange products, it has been found for most reactions homogeneously diluted contact masses are of advantage, particularly where the diluents are of a physical or chemical nature such as to exert a desired influence on the catalytic activity of the contact masses, as when, for example, diluents are rich in silica, which has been found to have an activating power, or where the diluents by reason of high porosity, capillarity, or surface energy may be considered as physical catalysts or activators.

Base exchange bodies used for contact masses of the present invention behave as if they were products of extremely high molecular weight for catalytically active components can be introduced either into the non-exchangeable nucleus or in the form of exchangeable bases in practically any desirable proportions and the ordinary law of chemical combining proportions, which in compounds of low molecular weight restricts the proportions in which components can be incorporated chemically, appears to be without force, which makes it reasonable to assume that the molecular weight is so high as to completely mask the effect of the law. It is, of course, possible that the base exchange bodies, or some of them, may be solid solutions of a plurality of related compounds of lower molecular weight. It has not been possible hitherto to definitely settle this question, as base exchange bodies are not readily capable of structural chemical analysis. The present invention is of course not limited to any theory, but irrespective of the underlying reactions the fact that catalytically active components may be chemically introduced in any desired proportions is of enormous importance to the catalytic chemist and gives him the power to produce an almost unlimited number of finely and gradually toned catalysts or contact masses for the various oxidations of organic compounds. In all cases the contact masses produced are highly effective by reason of the desirable physical structure of the leached base exchange products contained therein and the wide limits of homogeneous dilution of catalytically active molecules or atoms with resulting uniformity and smoothness of action, which is of great importance, particularly in the sensitive reactions such as the oxidation of many aromatic compounds in the vapor phase, a field of oxidation catalyses of organic compounds for which contact masses used in the present invention are peculiarly adapted.

In addition to the important characteristics with which the leached base exchange bodies of the present invention endow the contact masses, it has been found that for many of the reactions coming within the scope of the present invention, it is desirable to stabilize the contact masses. This can be effected by associating with the leached base exchange bodies or incorporating or forming therein compounds of the alkali forming metals, that is to say alkali metals, alkaline earth metals, and the strongly basic earth metals. These compounds appear to slow up or smooth out the catalytic reaction and will be referred to throughout this specification as stabilizers. The stabilizers may be physically admixed with the leached base exchange bodies of the present invention or where the leaching is not sufficient to remove all of the exchangeable bases these latter may act as stabilizers and for some reactions are particularly effective as they are in chemical combination with the leached base exchange body and are thus finely and homogeneously distributed throughout the contact mass.

It is difficult to accurately determine the extent of leaching in some cases and where a very close control of alkalinity is desirable a leached base exchange body in which perhaps too much of the exchangeable bases have been removed can be treated with suitable alkalies which will replace partly or wholly the bases leached out. This gives an additional possibility of controlling the final catalyst composition. In addition to the use of stabilizers which are important in a large number of organic oxidations, particularly oxidations to intermediate products or oxidations which have for their purpose the burning out of one or more components from a mixture of organic compounds, such as, for example, crude aromatic hydrocarbons e. g. anthracene, without substantially attacking the other components of the mixture, it has been found that the stabilizer action and the very high efficiency of the contact masses can in many cases be greatly enhanced by the association therewith or chemical combination therein of elements or radicals or groups which are catalytically active but which do not possess specific catalytic activity for the particular reaction to be carried out. Thus, for example, in the case of some oxidations which result in the production of water as a by-product dehydration catalysts may advantageously be present in the contact mass. In other cases where the oxidation is also to effect the splitting off of carbon dioxide catalysts which favor such splitting may be present. In other oxidations where condensation or polymerization is desired catalysts favoring these reactions may be present. These catalytically active components which are not specific catalysts for the particular organic oxidation in question will be referred to throughout the specification and claims as stabilizer promoters since they appear to enhance the toning effect which can be obtained with stabilizers. The use of this expression should in no sense be taken to limit the invention to a particular theory of action of these non-specific catalysts and in fact it is possible in certain few reactions, although generally not desirable, to use stabilizer promoters without stabilizers. It should be understood that the action of stabilizers while probably primarily due to slowing or stabilizing of the specific catalytically effective component of the contact mass does not in all cases or even normally result in a lower output. On the contrary the yields of a particular oxidation product, especially where it constitutes an intermediate oxidation stage, are normally increased by the choice of a suitable stabilizer and in many cases the output, particularly the output at good conversion yields in vapor phase oxidations, may be increased and in some cases may be very greatly increased by the presence of stabilizers. In all cases, however, the choice of suitable stabilizers with or without suitable stabilizer promoters enhances the overall efficiency of the reaction.

The tremendous range of chemical groups which may be combined in or with or incorporated in permutogenetic products permits a wide choice of stabilizer promoters as well as specific catalysts and permits their association with the contact masses in an extremely homogeneous and catalytically efficient form. Thus many base exchange bodies or their derivatives may be considered as complex catalysts, stabilizers and stabilizer promoters, as all of these elements may be present in the same chemical compound and sharing the advantages flowing from its desirable physical structure and chemical properties. Of course both stabilizer and stabiliber promoters may be mixed partly or wholly with permutogenetic products and a single stabilizer or single stabilizer promoter may be present partly in physical admixture and partly in chemical combination, as will be clear to the skilled base exchange chemist.

The base exchange bodies which form the important components or initial material for derivatives in contact masses of the present invention may be prepared by any of the well known methods. Thus for example, two-component zeolites may be prepared by wet methods, in which the metallate components or metal salt components, part or all of which may be catalytically active, are caused to react with soluble silicates to form zeolites of alumino silicate or aluminum double silicate types, or the components may be fused, preferably in the presence of fluxes. It should be understood that under the term metallate is included not only the alkaline solutions of amphoteric metal oxides or hydroxides but also alkali forming metal salts of metal acids, such as the oxyacids of metals of the fifth and sixth groups, which in at least one stage of oxidation are not strictly speaking amphoteric, but which products are capable of reacting with silicates to form zeolites, or with other components to form non-silicious base exchange bodies. Throughout the specification this somewhat more general definition of metallates will be strictly adhered to. In the formation of two-component zeolites by wet methods, the final reaction product must be alkaline to litmus, and for products of high base exchanging power it should be neutral or alkaline to phenolphthalein. For the purpose of producing base exchange bodies to be used in the preparation of contact masses of the present invention it is sometimes unnecessary to provide high base exchanging power, and for many purposes zeolites formed under conditions resulting in a final reaction which is acid to phenolphthalein but alkaline to litmus are of advantage. It is not definitely known whether products produced under such circumstances are homogeneous chemical compounds, although in many ways they behave as such. There is, however, reason to believe that in some cases at least mixtures of base exchanging and non-base exchanging polysilicates may be produced. For the purpose of the present specification a product will be considered as a base exchange product if it has any base exchange power at all.

It is desirable for many purposes and particularly where two-component zeolites of high base exchanging power are needed to add the relatively acid components, for example, metal salts, in the case of aluminum double silicate type of silicates, to the relatively more alkaline components such as for example soluble silicates. By these means a continuous alkalinity is insured, and this method may be considered as the preferred method in most cases, but the opposite precedure is advantageous for certain contact masses and is included in the invention.

Multi-component zeolites may be prepared by any of the foregoing methods using at least three types of components, that is to say, at least one metallate, at least one metal salt and at least one soluble silicate. In the case of multi-component zeolites, as in the case of two-component zeolites, the conditions of alkalinity should be observed, and for many purposes it is advantageous to add the relatively acid components to the relatively alkaline components, in order to insure continuous alkaline reaction. The multi-component zeolites produced vary in their nature, dependent on the proportion of the different reacting components. Thus where the metallates and silicates predominate over the metal salts the resulting products resemble the alumino silicate type of two-component zeolites. If the metal salts and silicates predominate over the metallates the products resemble the aluminum double silicate type of two-component zeolites, and finally if the metallates and metal salts predominate over the silicates the resulting product resembles more or less non-silicious base exchange bodies. It will be clear that there is no sharp defining line between the three types of multi-component zeolites, and one shades into the other as the proportions of the different components vary. It is an advantage of the multi-component zeolites over the two-component zeolites that the choice of catalytically active components is wider, as some catalytically active elements or groups can only be incorporated in the form of metallates and others only in the form of metal salts. In a multi-component zeolite each catalytically active group can be incorporated in the form in which it is best available.

Non-silicious base exchange bodies are produced by the general methods described above, but instead of bringing about reactions between silicates and other metal oxide components, two or more oxymetal compounds are caused to react, in general, at least one will be a metallate and at least one a metal salt, or in some cases it is possible to bring about action between two different metallates in which one negative radical is more acidic than the other. It is possible to produce non-silicious base exchange bodies in which a plurality of metal oxides are present. It is also possible to produce non-silicious base exchange bodies in which a single metal is present. Thus for example, some metals may be sufficiently amphoteric in character to form both metallates and metal salts which are capable of reacting with each other to produce base exchange bodies.

A special method of producing non-silicious base exchange bodies consists in the gradual neutralization of strongly alkaline salts of the oxyacids of metal elements of the fifth and sixth groups in stages of oxidation in which they are sufficiently amphoteric. The neutralization of other strongly alkaline metallates may also bring about formation of non-silicious base exchange bodies. The converse method, whereby non-alkaline salts of suitable metals are gradually treated with alkali until the reaction is sufficiently alkaline to permit the formation of base exchange bodies, may also be used.

Many metals are capable of entering into the base exchange formation only in certain stages of oxidation, and it is sometimes necessary to introduce such metals in a stage of oxidation different from that desired in the final base exchange body, the change of stage of oxidation being preferably effected during the formation of the base exchange body. Certain other elements may be incorporated in the form of complex compounds of the most various types, such as for example, ammonia complexes and the like.

In addition to the artificial base exchange bodies briefly described above, natural base exchange bodies, such as nepheline, leucite, felspar, and the like, may be used.

The most important contact masses for many reactions contain permutogenetic products, in which preferably the diluents are homogeneously incorporated into the base exchange bodies before formation of the latter, or at least before the base exchange body has set after formation. Many diluents, both inert, stabilizing, activating, catalytically active, or having stabilizer promoter effects, can be used. A few of the diluents will be briefly enumerated:—kieselguhrs of all kinds, particularly natural or treated "Celite" earth, silicious powders of various types, powdered permutogenetic products, natural or artificial powders of rocks, stones, tuffs, trass, lava, and similar volcanic products which are frequently highly porous, greensand, glauconite or its acid leached derivative glaucosil, pulverized slag wool, cements, sand, silica gel, pulverized earthenware, fuller's earth, talc, glass powder, pumic meal, asbestos, graphite, activated carbon, quartz meal, various pulverized minerals rich in quartz, metal powders and metal alloy powders, salts of oxymetal acids such as tungstates, vanadates, chromates, uranates, manganates, cerates, molybdates, etc., particularly copper salts of the above, silicates, such as copper silicate, iron silicate, nickel silicate, cobalt silicate, aluminum silicate, titanium silicate, minerals or ores, especially those rich in copper, etc. Finely divided diluents are of great advantage, especially when the average particle size is less than 60 microns, in which case the diluents possess high surface energy, which increases the adsorptive and absorptive capacity of the contact mass, the diffusion speed and porosity. These finely divided diluents may be considered as physical catalysts or activators. Diluted permutogenetic bodies may also be finely divided and used as part or all of the diluents of other base exchange bodies.

The following nine methods are the most effective for the introduction of diluents, but any other suitable methods can be used. Examples of methods for incorporating diluents are described in detail in the co-pending application of Jaeger and Bertsch, Serial No. 95,771, filed March 18, 1926, and any of the methods described can be used in incorporating diluents in the present invention:

(1) The diluents may be mixed with one or more liquid components of the base exchange bodies to be formed when the latter are prepared by wet methods.

(2) Components, either catalytically active, stabilizer promoters, or others, may be precipitated or impregnated into diluent bodies which are then incorporated into the base exchange bodies by any suitable methods of incorporation.

(3) Diluents may be mixed with base exchange bodies when the latter are still in the form of gels, by kneading or stirring, in which case the base exchange gel behaves as an adhesive. The homogeneity and uniformity of the distribution of the diluents is of course not quite so great by this method as by method (1), but for many catalytic oxidations of organic compounds extreme uniformity is not essential.

(4) Diluents may be formed during the formation of base exchange bodies by mixing suitable compounds with the components of the base exchange bodies so that the diluent particles are precipitated during formation. Protective colloids may be added to prevent coagulation of the diluent particles before the base exchange bodies have become sufficiently set.

(5) Compounds may be added which react with certain of the base exchange bodies forming components to produce diluents, for instance salts of the metal acids of the fifth and sixth groups may be added in sufficient excess so that they react with components of the base exchange body to form insoluble diluents, as for example with heavy metal oxides.

(6) Preformed base exchange bodies, diluted or undiluted, artificial or natural, can be impregnated with true or colloidal solutions of catalytically effective components and then dried.

(7) A preformed base exchange body, diluted or undiluted, may be impregnated with a plurality of solutions which react therein to precipitate any desired diluents.

(8) Soluble diluent compounds may be added to the components forming a base exchange body, which after formation retains the compounds in solution and is dried without washing or is treated to precipitate the compounds.

(9) Natural base exchange bodies or artificial base exchange bodies, diluted or undiluted, or their derivatives, may be impregnated with solutions of the desired compounds, which are then precipitated by means of reactive gases.

The nucleus or non-exchangeable portion of the molecules of the base exchange bodies is ordinarily considered to consist of two types of oxides, namely, relatively basic metal oxides, usually amphoteric, and relatively acidic oxides, such as $SiO_2$, some amphoteric metal oxides and some metal oxides which have a distinctly acid character. The nucleus behaves as a single anion and cannot be split by ordinary chemical means, but it is advantageous to consider the two portions of the nucleus as the basic and acidic portions, bearing in mind of course that the nucleus behaves as a single group. The metal compounds which are capable of forming the basic portion of the nucleus are those of the following metals:—copper, silver, gold, bismuth, beryllium, zinc, cadmium, boron, aluminum, some rare earths, titanium, zirconium, tin, lead, thorium, niobium, antimony, tantalum, chromium, molybdenum, tungsten, uranium, vanadium, manganese, iron, nickel, cobalt, platinum, palladium. Compounds of these elements may be introduced singly or in mixtures, in any desired proportion, and may be in the form of simple or complex ions. It should be understood that some of the elements in certain stages of oxidation may be introduced either as metallates or metal salts. Others may be introduced in only one form, and still others may be introduced in a stage of oxidation other than that desired in the final base exchange body or in the form of complex compounds. Among the complex ionogens are ammonia, hydrocyanic acid, oxalic acid, formic acid, tartaric acid, citric acid, glycerine, and the like.

Many of the metals are specific catalysts, others are stabilizers, and still others are stabilizer promoters. Naturally the status of an element as catalyst or stabilizer promoter will vary with the particular oxidation reaction for which the final contact mass is to be used, and the choice of catalysts and stabilizer promoters together with the proportions will be determined by the particular catalytic oxidation of the particular organic compound for which the contact mass is to be used.

Examples of components forming the relatively acid portion of the base exchange nucleus are alkali metal silicates, which are soluble in alkali, and alkali metal salts of acids, such as those of boron, phosphorus, nitrogen, tin, titanium, vanadium, tungsten, chromium, niobium, tantalum, uranium, antimony, manganese, etc.

The exchangeable bases of the base exchange bodies may be substituted by base exchange, and the elements which can be introduced singly or in admixture by base exchange are the following:—copper, silver, gold, ammonium, beryllium, calcium, manganese, cæsium, potassium, sodium, zinc, strontium, cadmium, barium, lead, aluminum, scandium, titanium, zirconium, tin, antimony, thorium, vanadium, lithium, rubidium, thallium, bismuth, chromium, uranium, manganese, iron, cobalt, nickel, ruthenium, palladium, platinum and cerium.

Depending on the reactions in which the contact mass is to be used, the exchangeable bases introduced may be specific catalysts, they may be stabilizers, or they may be stabilizer promoters. They may be introduced as simple ions or as complex ions, and may enhance the catalytic activity of the final contact mass, improve its physical structure, or both.

Leached base exchange bodies, diluted or undiluted, may also be coated on to massive carrier granules in the form of films or impregnated therein. The massive carriers may be inert, activating or themselves catalysts. For example, certain catalytic metal alloys containing vanadium, chromium, tungsten, uranium, molybdenum, and other metals which are oxidation catalysts may be used. Metal carrier fragments and especially metals of high heat conductivity, such as aluminum, perform an additional advantageous function in that their relatively high heat conductivity tends to prevent local overheating which is of great importance since most of the organic oxidations falling within the scope of the present invention are strongly exothermic and some of them are exceedingly sensitive to temperature conditions and tend easily to get out of control with excessive temperatures.

The leaching may be carried out in any suitable manner and under the term "leaching" processes in which the base exchange body is washed with dilute acids are included. In fact any treatment with an acid which results in the removal by chemical action of any portion of the bases present in the base exchange body will be considered to be covered by the term "leaching".

For many organic oxidations, it is desirable to subject the contact masses to preliminary calcination with air or with acid gases. This latter treatment is not so important where the leaching has been carried out to a high degree as one of its most important functions lies in the reduction of strong alkalinity which is effected thereby and, of course, in extensively leached contact masses of the present invention the alkalinity is substantially completely destroyed. However, calcinations and acid gas treatments may be used and are of advantage with a large number of contact masses of the present invention, particularly such contact masses where the leached base exchange body may be itself employed as a diluent in other catalytically inactive or active base exchange bodies. In such cases the leached body may not in itself show excessive alkalinity for certain reactions, but it may be associated with other components which are too strongly alkaline to give good results and in such cases treatment with acid gases is of great importance. The calcination and catalyses themselves particularly vapor phase catalyses, usually result in certain chemical transformations in the contact mass, especially on its surface, which are not well defined and the contact masses of the present invention are defined in the specification and claims as of the time when they are freshly prepared in accordance with the usual method of definition in catalytic chemistry.

Where the leached base exchange bodies contain considerable amounts of basic components and especially where the leaching has stopped short of complete removal of exchangeable bases, salt-like bodies of the base exchange body can be prepared and are, of course, included within the scope of the present invention. Acidic radicals which may be caused to react may be catalytically active, inert or may act as stabilizer promoters. Among the important catalytically active radicals are those of the oxy acids of the metals of the 5th and 6th groups of the periodic system, particularly such elements as vanadium, molybdenum, tungsten, uranium, chromium, and the like. Other acid radicals may be used such as those of manganese, selenium, tellurium, arsenic, phosphorus, sulfur, chlorine, bromine, fluorine, nitrogen and boron. Simple acids or their salts may be used or peracids or complex acids, such as those containing ferro and ferricyanogen, sulfocyanogen or other metal cyanogen groups may be employed. Ammonia complexes are also effective. The catalytic activity of the salt-like body contact masses may reside partly or wholly in the leached base exchange body nucleus, in the acid radicals united therewith, or in the form of diluents physically associated with the contact mass. The contact masses used in the present invention are effective in all organic oxidations and examples are the following:

1. Reactions in which an intermediate oxidation product is produced. The oxidation of benzol, toluol, phenol, tar phenols or furfural, and other compounds containing the group —$CH_2$—CH=CH—$CH_2$— to maleic acid and fumaric acid or mesotartaric acid; cresol to salicylaldehyde and salicylic acid; toluol and the various halogen and nitro substituted toluols to the corresponding aldehydes and acids; xylenes, pseudocumene, mesitylene, paracymene and other derivatives to the corresponding aldehydes and acids; naphthalene to naphthaquinone, phthalic anhydride and maleic acid; phthalic anhydride to maleic acid and fumaric acid; anthracene to anthraquinone, phenanthrene to phenanthraquinone, diphenic acid, phthalic anhydride and maleic acid, acenaphthene to acenaphthylene, acenaphthaquinone, bisacenaphthylidenedione, naphthaldehydic acid, naphthalic anhydride and hemimellitic acid; fluorene to fluorenone; eugenol and isoeugenol to vanillin and vanillic acid; methyl alcohol and methane to formaldehyde; ethyl alcohol to acetic acid; ethylene chlorhydrine to chloracetic acid and the like.

2. Reactions in which an undesired impurity is burned out, such as the purification of crude anthracenes of various degrees of impurity with total combustion of carbazole, dead oils and in some cases phenanthrene; purification of crude naphthalenes and crude mononuclear hydrocarbons, such as benzols and the like; purification of ammonia from coal tar with the burning out of the organic impurities such as phenolic bodies present, etc.

3. Oxidation of mixtures of organic compounds to desired intermediate products with removal of impurities such as the oxidation of crude anthracenes, phenanthrenes, and the like to intermediate products such as anthraquinone, phenanthraquinone, diphenic acid, phthalic anhydride, and the like with cocomitant removal of carbazole and dead oils by total combustion; the oxidation of crude tar acids to maleic and fumaric acids with the combustion of certain impurities, etc.

The most important elements in oxidation catalysts for the first and third groups are the metals of the 5th and 6th groups of the periodic system and particularly vanadium although, of course, the application is in no sense limited to contact masses which contain one or more of these elements. For the reactions in group two, other elements are frequently more effective as catalysts, thus for example, copper, cobalt and iron appear to be particularly effective, with or without metals of the third and fourth groups of the periodic system. The purifications, particularly when a heterocyclic impurity such as carbazole is to be burned out, frequently require a large amount of stabilizer and in some cases the contact mass should contain more stabilizer than specific catalyst whereas in most contact masses of the present invention and particularly those which are intended for the reactions listed under group one, the catalytically effective elements are normally in excess over the stabilizers. Purification reactions also utilize effectively strongly alkaline stabilizers. On the other hand the reactions in group one normally are more effectively carried out with non-alkaline stabilizers or at least with stabilizers which do not possess a strong alkalinity.

Owing to the tremendous number of organic oxidations for which contact masses of the present invention can be effectively used, the choice of catalyst, stabilizer and stabilizer promoter components will vary greatly and will be chosen by the skilled catalytic chemist in accordance with the particular catalytic reaction in which he is interested. It should be borne in mind in this connection that a component which may be a specific catalyst for one reaction may be a stabilizer promoter for another reaction and therefore the concepts of catalysts and stabilizer promoters should not be considered as defining chemical classes of compounds in an absolute sense and on the contrary they are relative terms depending on the particular oxidation reaction in which the contact mass is to be used.

The following specific examples will illustrate the use of certain typical contact masses of the present invention in representative organic oxidations. The invention is, of course, in no sense limited to the specific details enumerated in the examples but in its narrower aspects the special features described in examples are included as specific or limited embodiments of the invention.

Example 1

The following three mixtures are prepared:

(1) 280 parts of pumice meal or asbestos fibers are impregnated with a manganese nitrate solution containing 1% of manganese and being sufficiently dilute to permit proper impregnation of the material. Thereupon the product is washed with a 10% ammonia solution and then with water in order to remove the ammonia. The impregnated pumice is stirred into a waterglass solution of about 33° Bé. containing 24–30 parts of $SiO_2$ diluted with 5–6 volumes of water.

(2) 9.1 parts of $V_2O_5$ are dissolved in sufficient normal sodium hydroxide solution so that the product is almost neutral to litmus. About 19.5 parts of $FeSO_4$ plus $7H_2O$ in the form of a fairly dilute water solution is added and a precipitate of iron vanadate admixed with iron oxide is obtained.

(3) 18.2 parts of $V_2O_5$ are treated with 2% of their weight of concentrated sulfuric acid and diluted with 200 parts of water. The mixture is gently boiled and gaseous $SO_2$ passed through until a clear blue solution of the vanadyl sulfate is obtained. The blue solution is gradually treated with 10 N. caustic soda until the precipitate of vanadium hydroxide which forms at first dissolves in the caustic soda to form a coffee-brown sodium vanadite solution.

Suspensions (1) and (2) are then poured together and immediately solution (3) is introduced in a thin stream with vigorous agitation. Most of the excess alkali is neutralized with 10% sulfuric acid and the gel which forms is well pressed, washed two or three times with 300 parts of water and dried at temperatures of about 100° C. The product is a zeolite containing tetravalent vanadium diluted with the impregnated pumice meal or asbestos fibers and iron vanadate. The product is cautiously leached with 2–3% hydrochloric or sulfuric acid in order to remove the exchangeable alkali, then washed to free it from acid and dried, preferably under 100° C. The leached base exchange body obtained is pressed into suitable granules and is then an effective catalyst for the catalytic oxidation of anthracene to anthraquinone under the usual reaction conditions. An even more effective contact mass can be obtained by pulverizing the leached base exchange body and suspending it in a solution of a cementing agent, such as potassium sulfate, bisulfate or acid phosphate, which solution may advantageously contain from 10-15% of the cementing agent, together with sufficient water to form a good suspension. The suspension is then sprayed onto fragments of pumice or roughened quartz fragments to produce a uniform and effective coating. The contact mass, either in the form of granules or coated onto fragments, is calcined with air at about 450° C. and is well suited for the vapor phase oxidation of anthracene to anthraquinone and acenaphthene, acenaphthylene or their halogen derivatives to the corresponding naphthalic anhydrides. The vapors of the aromatic compounds in question, preferably having a purity of about 90%, are mixed with air in the proportion of 1:18 by weight and passed over the contact mass at 360–420° C. Excellent yields of the desired product are obtained and impurities, such as carbazole and phenanthrene in the case of anthracene, are completely burned out. The proportion of aromatic hydrocarbons to air can be varied within fairly wide limits without seriously affecting the yield.

Instead of preparing a two-component zeolite by the reaction of a vanadite with waterglass, zeolites can be prepared by the reaction of sodium or potassium vanadate with waterglass under the conditions described above and when leached result in excellent catalysts.

Instead of using metallate solutions, such as vanadites and vanadates referred to above, metal salt solutions can be used in which the metal bases are sufficiently amphoteric, thus for example the corresponding zeolites can be prepared by the interaction of vanadyl sulfate and waterglass, the amounts of the components being so chosen as to produce a reaction product which is alkaline to litmus or preferably alkaline or neutral to phenophthalein.

Corresponding three-component zeolites may also be prepared by bringing about the interaction of waterglass with potassium or sodium vanadite and vanadyl sulfate, the vanadite solution being first mixed with the waterglass solution and then the vanadyl sulfate added with vigorous agitation until the gel-like reaction product remains alkaline to litmus, or preferably alkaline or neutral to phenolphthalein.

The leaching of the dried diluted zeolites described above can be effected by hydrating in the usual manner and then permitting dilute organic or inorganic acids to trickle over the zeolite until part or all of the exchangeable alkali is leached out. Instead of using quartz or pumice fragments as carriers, suspensions of the leached zeolites may be coated onto coarse natural or artificial granules of diatomaceous earth, filter stones, silicates, rocks, certain minerals, etc. using waterglass or alkali metal compounds as cementing agents.

Instead of coating the ground leached zeolites onto fragments, they may be mixed with waterglass solutions or alkali metal compounds and then formed into suitable pellets having the proper shape for use in converters for the catalytic oxidation of organic compounds, for example tubular bath converters.

Instead of directly leaching the base exchange bodies, they may first be hydrated and then treated with salt solutions in order to exchange part or all of the exchangeable alkali for bases of the solutions. Thus, for example, 5-10% solutions of copper sulfate, ferric chloride, cobalt nitrate, nickel nitrate, manganese nitrate, etc. singly or in admixture, are permitted to trickle over the base exchange body until no further base exchange takes place. Such a zeolite, for example a cuprovanadium zeolite if the solution was one of a copper salt, is treated with dilute acids, such as 2-3% sulfuric or hydrochloric acid or a 10-15% organic acid, such as acetic acid, maleic acid, phthalic acid, etc., in order to leach out part or all of the exchangeable bases. The leaching may be carried out by placing the material on an ordinary filter and permitting the acid solutions to trickle over it from one-half to two hours depending on the extent to which it is desired to carry out the leaching.

Leached zeolites having heavy metal bases introduced by base exchange are well suited for the catalytic oxidation of benzol, toluol, phenol, tar acids, furfural or phthalic anhydride to maleic acid when the vapors of any of these substances mixed with air in the proportion of 1:16–25 parts by weight of air are passed over the contact mass at 350–420° C. Good yields of maleic and fumaric acids are obtained and the quality is excellent.

Another class of leached zeolites may be obtained by first forming the salt-like bodies of the zeolites and then leaching. For example, a cuprovanadium zeolite such as that described above may be caused to react with compounds containing radicals of the metal acids of the fifth and sixth groups of the periodic system, such as 1% ammonium or potassium vanadate, tungstate, molybdate or tantalate solutions, or mixtures thereof. The salt-like bodies are leached in the same manner as the ordinary zeolites and after leaching the contact masses produced are well suited for the oxidation of toluol to benzaldehyde and benzoic acid. A mixture of toluol and oxygen-containing gases in the proportion of 2 parts of toluol to 25-30 parts by weight of air is passed over the contact mass at 340–380° C. in a converter provided with powerful cooling means. Air may be used or a mixture of carbon dioxide and oxygen in the ratio of 10:2 may be employed in a circulatory process, the carbon dioxide acting as a permanent, inert gas, oxygen being introduced in a suitable place in the cycle and the benzaldehyde and benzoic acid formed being separated out at another point. In carrying out this very sensitive reaction, it is often of advantage, whether working in a circulatory process or a straight catalysis, to carry out the reaction in the presence of protecting agents in a gaseous or vapor form, such as vapors of carbon tetrachloride or other vapors which are difficulty oxidizable. The yields of benzoic acid and benzaldehyde are materially increased when the reaction is carried out in the presence of such protecting vapors.

The contact masses described above may also be used for the catalytic oxidation of methyl alcohol or methane to formaldehyde using air as an oxidizing agent. Good yields are obtained.

Instead of using vanadium in various stages of oxidation in the non-exchangeable part of the zeolite, other sufficiently amphoteric elements may be substituted partly or entirely, such as for example tungsten, aluminum, manganese, chromium, etc., or a mixture of two or more of them.

Example 2

100 parts of an ordinary artificial zeolite containing sodium and aluminum, which may be prepared either by fusion or wet methods, or a similar amount of natural zeolites are repeatedly digested with a 5% lead nitrate solution, introducing lead into the zeolite by base exchange. The excess lead nitrate is then removed by washing the product and treating with a 10% vanadate solution until a vanadate of the lead zeolite is obtained. The excess vanadate solution is then thoroughly washed out, the product dried at temperatures under 100° C. and then leached on a filter with 500 parts of 2–3% sulfuric acid. Thereupon the excess acid is washed out with the same amount of water and the leached mass is calcined at about 100° C. and placed in a converter. A mixture of acenaphthene vapors and air in the proportion of 1:14 by weight is passed over the contact mass at 300–450° C. Excellent yields of acenaphthylene of a beautiful golden color are produced. Other effective derivatives may be prepared by substituting copper, nickel, cobalt, silver, manganese, chromium, or aluminum for part or all of the lead and then treating with one or more compounds containing acid radicals of the metal elements of the fifth and sixth groups of the periodic system, such as vanadic acid, tantalic acid, tungstic acid, uranic acid, chromic acid, or bismuthic acid, or a mixture. The zeolites are then leached with 2–3% hydrochloric acid or 8–10% acetic acid and can then be used as contact masses for the catalytic oxidation of ortho- and parachlor- and bromtoluols, dichlortoluols, chlorbromtoluols, nitrotoluols, bromnitrotoluols, etc. to the corresponding benzaldehydes and benzoic acids. The vapors of the compounds mixed with air in the proportion of 1:10 to 1:35 are passed over the contact mass at 320–450° C. These contact masses may also be used for the catalytic oxidation of homologues of toluols, such as xylol, mesitylene, pseudocumene, paracymene, etc. to the corresponding aldehydes and acids.

The leached base exchange bodies can also be used as carrier materials on which other catalytically active materials are coated, thus forming composite contact masses which are valuable for the oxidation of organic compounds.

Example 3

Three solutions are prepared, as follows:

(1) 42 parts of $SiO_2$ in the form of a 33° Bé. waterglass solution are diluted with 200 volumes of water and 70 parts of "Celite" earth are stirred in.

(2) 18.2 parts of $V_2O_5$ are dissolved in a concentrated caustic potash solution to form a 10% potassium vanadate solution.

(3) 5 parts of aluminum oxide are dissolved up in a 5 N. potassium hydroxide solution to form a potassium aluminate.

The three mixtures are poured together and heated to 60–70° C. and 10% sulfuric acid is permitted to run in with vigorous agitation until the whole mass solidifies to a gel which must, however, remain alkaline to litmus. The gel is sucked, thoroughly pressed, dried at temperatures below 100° C., broken into fragments and hydrated by trickling water over it. 1–3% sulfuric acid is then permitted to trickle over the zeolite in order to leach out part of the exchangeable alkali. Thereupon the contact mass is calcined with air and diluted $SO_2$ gases at 420–500° C. After calcination a mixture of naphthalene vapor and air in the proportion of 1:10–1:15 is passed over the contact mass at 380–420° C. Excellent yields of phthalic anhydride of high purity are obtained.

If the proportion of naphthalene vapor to air is changed to from 1:30 to 1:40 and the reaction temperature is dropped to 360–380° C., high yields of alphanaphthaquinone are obtained accompanied by small amounts of phthalic anhydride.

If desired, the base exchange body can be comminuted and coated onto massive natural or artificial granules such as fragments of ilmenite, bauxite, minerals rich in silica, such as roughened quartz fragments, fragments of quartz filter stones, "Celite" brick fragments, metal granules, such as aluminum granules, metal alloy granules such as ferrovanadium, ferromolybdenum, ferrosilicon, silicon ferromanganese, silicon aluminum ferromanganese, ferrotitanium, ferrotungsten, and the like. The coating may be effected by heating the massive carrier fragments to 100–150° C. with agitation and spraying a suspension of the leached base exchange body onto them accompanied by a second spray of a diluted cementing agent, such as a potassium waterglass, potassium sulfate, potassium bisulfate or potassium phosphate solution. In this manner a uniform and strongly adherent film is formed.

Coated contact masses are well suited for the oxidation of naphthalene to phthalic anhydride. If iron, cobalt or manganese are introduced by base exchange before leaching the contact masses are well suited for the catalytic oxidation of anthracene to anthraquinone or of acenaphthene or acenaphthylene to naphthalic anhydride.

Example 4

22 parts of basic copper carbonate are dissolved in the form of a cuprammonium compound. 10.2 parts of freshly precipitated aluminum hydroxide are dissolved in sufficient 2 N. sodium hydroxide solution to form a clear sodium aluminate solution. 24 parts of copper nitrate containing 3 mols of water are dissolved in 100 parts of water. The cuprammonium carbonate and the aluminate solution are then mixed together and the copper nitrate solution poured in with vigorous agitation. A gelatinous product is formed which is neutral or slightly alkaline to phenolphthalein, which constitutes a non-silicious base exchange body containing sodium, copper and aluminum. The gel is pressed and dried at temperatures under 100° C. and then hydrated with water. Thereupon the non-silicious base exchange body is placed on a Nutsch filter and carefully leached with 2–5% sulfuric acid, 250–500 parts of the diluted acid being gradually trickled over the base exchange body. If desired part of the exchangeable alkali may be replaced by such bases as iron, cobalt, manganese, chromium titanium, zirconium, copper or thorium by trickling 5–10% solutions of the corresponding salts over the base exchange body. Thereupon the product is leached to remove exchangeable alkali.

Salt-like bodies of the base exchange body may also be formed as has been described above in the foregoing examples and then leached.

The contact masses after leaching are kneaded with 15–20% by weight of potassium sulfate, potassium nitrate, potassium chloride, potassium hydroxide, potassium carbonate, potassium phosphate or other alkali metal compounds in the form of water solutions or waterglass solutions may be used as cementing agents. The kneaded products are formed into suitable pellets and calcined at temperatures above 400° C. These contact masses are well suited for the catalytic purification of crude anthracene to a high grade anthracene with total combustion of the main impurities, such as carbazole, and more or less total combustion of phenanthrene depending on the reaction conditions. Thus, for example, 25-50% crude anthracene, especially 30-35% anthracene presscake, is uniformly vaporized with air in the ratio of about 1:20 by weight and then passed over the contact mass at 380-430° C. The purified anthracene obtained contains 70-80% anthracene, practically no carbazole, and the remainder is practically pure phenanthrene. After recrystallization from the minimum amount of solvent naphtha, sufficient to dissolve the purified anthracene at 80° C. followed by cooling to 15° C., the recrystallized anthracene contains 95-97% anthracene, is practically colorless and of excellent quality. In the catalytic purification yields of over 90% of the anthracene present in the crude anthracene may be obtained. The phenanthrene which can be obtained from the mother liquor of the crystallizing step is also of excellent purity. Instead of using the contact masses as described, the leached base exchange mass can be comminuted and coated onto fragments of pumice, quartz, iron ores, copper ores, diaspore, and the like, and these coated contact masses are also well suited for the catalytic purification of anthracene under the reaction conditions described above.

Instead of introducing copper in the form of the cuprammonium compound, it may also be used in the form of copper salt, such as copper sulfate or copper nitrate. When bringing about a reaction between a copper salt solution and the aluminate, it is necessary to take care that the reaction product remains neutral or alkaline to phenolphthalein. The copper may also be replaced partly or entirely by one or more salt solutions containing iron, cobalt, nickel, chromium, aluminum, titanium, cadmium, thorium, zirconium, tin, or vanadium in the form of vanadyl compounds. These contact masses are very effective, especially where iron or cobalt is present. The aluminate solution may also be partly or entirely replaced by one or more other metallate solutions, such as, for example, zincates, cadmiates, plumbites, etc.

The contact masses described above are not only suitable for the catalytic purification of crude anthracene but they may also be used for the purification of crude naphthalene, crude benzene or other crude coal tar fractions. Another field in which the contact masses are well suited is the catalytic purification of coal tar or by-product ammonia, the organic impurities being burned out or transformed into acids. By-product ammonia mixed with air, preferably using a large excess of air according to the organic impurities present, is passed over the contact mass at 380-450° C. The organic impurities are entirely burned out, transformed into water soluble compounds resulting in a purification of the ammonia by selective oxidation of the impurities.

*Example 5*

13 parts of vanadium pentoxide are suspended in 250 parts of water acidulated with concentrated sulfuric acid and reduced to the blue vanadyl sulfate using sulfur dioxide. The solution is boiled and concentrated in 150 parts of water. 10 parts of aluminum oxide are transformed into potassium aluminate by means of a 5 N. potassium hydroxide solution. One-third of the vanadyl sulfate solution is treated with 10 N. potassium hydroxide to transform it into coffee-brown potassium vanadite which is then mixed with potassium aluminate and 100 parts of infusorial earth are then stirred in, whereupon the remaining two-thirds of the vanadyl sulfate solution is added with vigorous agitation. The final product, which should remain strongly alkaline to litmus, is pressed, dried as usual, preferably under 100° C., broken into fragments, hydrated with water in the usual manner and then carefully leached with 200 parts of 5% sulfuric acid, which can be effected by trickling the acid over the base exchange body. The leached product is then calcined with air at 400° C. and is an excellent contact mass for the vapor phase oxidation of naphthalene to phthalic anhydride. A mixture of naphthalene vapors and air in the proportion of 1:18 by weight is passed over the contact mass at 380-420° C.

*Example 6*

Three solutions are prepared, as follows:

(1) 210 parts of 33° Bé. potassium waterglass solution are diluted with 6-8 volumes of water and a mixture of comminuted silicates and kieselguhr is stirred in until the suspension just remains easily stirrable. The mixed diluent should preferably contain more than 25% of kieselguhr.

(2) 18 parts of $V_2O_5$ are reduced to a blue vanadyl sulfate solution in a hot aqueous solution acidified by sulfuric acid, sulfur dioxide being used as the reducing agent. The vanadyl sulfate is transformed into a brown solution of potassium vanadite by means of sufficient 10 N. caustic potash solution.

(3) A saturated aluminum sulfate solution is prepared.

Suspension (1) and solution (2) are poured together and a sufficient aluminum sulfate solution is added in a thin stream with vigorous agitation to bring the reaction mixture to neutrality to phenolphthalein or to a point which is just on the alkaline side. The mass solidifies to a dirty green gel, is filtered with suction, slightly washed and dried and is a three-component zeolite containing tetravalent vanadium, aluminum and $SiO_2$ in the non-exchangeable form. If desired, the diluents may be suspended in solution (2) or may be stirred into a mixture of waterglass and aluminum. Part or all of the aluminum in solution (2) may be substituted by corresponding amounts of a potassium vanadate solution prepared by dissolving $V_2O_5$ in 2 N. potassium hydroxide. The vanadium may be partly or wholly replaced by other metallates.

Instead of using the aluminate solution in solution (3), it may be substituted partly or wholly by one or more other metal salt solutions, such as, for example, copper sulfate, nickel sulfate, cobalt sulfate, iron sulfate, manganese nitrate, ferric chloride, zinc sulfate, cadmium sulfate, titanium nitrate, thorium nitrate, zirconium nitrate, etc.

After drying the products, preferably at 100° C., they may be subjected to base exchange after hydrating or salt-like bodies can be formed. Thereupon they are leached with 2-4% hydrochloric acid and the leaching may be carried out as far as necessary, depending on the amount of alkali which it is desired to retain in the product. After leaching the material is formed into suitable pellets using a small amount of potassium waterglass as a cementing agent. These contact masses containing vanadium are well suited for the catalytic oxidation of naphthalene to phthalic anhydride, under the reaction conditions described in the foregoing examples. Contact masses which contain iron or manganese in non-exchangeable form in addition to the vanadium can be used for the catalytic oxidation of anthracene to anthraquinone. Such contact masses may also be used for the catalytic oxidation of crude anthracene directly to anthraquinone. Thus 40–50% crude anthracene is uniformly vaporized with air at the ratio of 1:25 and passed over the contact mass composition at 380–450° C.

Contact masses which contain copper, silver or iron in exchangeable form can be used for the catalytic oxidation of methanol and methane to formaldehyde. Similar contact masses are well suited for the catalytic oxidation of isoeugenol to vanillin and vanillic acid; fluorene to fluorenone; benzol to benzoquinone, cresol to salicylaldehyde and salicylic acid; phenanthrene to maleic acid; and ethyl alcohol and ethylenechlorhydrine to the corresponding acetic acids. The contact masses which contain iron and aluminum in the non-exchangeable portion of the leached base exchange body or are present as diluents are suitable for the catalytic oxidation of acenaphthene and acenaphthylene to naphthalic anhydride and hemimellitic acid.

*Example 7*

Three mixtures are prepared, as follows:

(1) 6.6 parts of freshly precipitated $Al_2O_3$ are dissolved in a normal KOH solution in order to form the corresponding potassium aluminate. To this solution are added diluents rich in silica, such as ground rocks, tuffs, lava of volcanic or eruptive origin, artificial and natural zeolites, kieselguhr, "Celite" brick refuse, etc. When using "Celite" brick refuse or kieselguhr 50–80 parts are sufficient.

(2) 80 parts of 33° Bé. potassium waterglass solution are diluted with 100 parts of water.

(3) 24 parts of aluminum sulfate with 18 mols of water are dissolved in 150 parts of water.

The aluminate suspension (1) is rapidly mixed with the waterglass solution with vigorous agitation and the aluminum sulfate solution is then introduced in a thin stream, a diluted three-component zeolite being precipitated in a gelatinous form. The mother liquor is removed in the usual way, the presscake dried below 100° C. and broken into fragments. A small amount of very dilute sulfuric acid (5%) may be used to increase the yield, but care should be taken that the reaction product and mother liquor remain substantially neutral or weakly alkaline to phenolphthalein. In this zeolite, the silicate and metallate components predominate over the metal salt component so that the resulting product resembles the aluminosilicate type of zeolite. If desired, the order in which the three classes of components are caused to react may be changed to produce modified zeolites. The relative amount of the components may also be changed, for example, as follows:

(1) 3.4 parts of freshly precipitated $Al_2O_3$ are dissolved in N. KOH to form a potassium aluminate solution.

(2) 120–150 parts of 33° Bé. potassium waterglass solution are dissolved in about 200 parts of water.

(3) 44 parts of aluminum sulfate with 18 mols of water are dissolved in 200 parts of water.

Many diluents, catalytically active, stabilizers, stabilizer promoters, inert or possessing two or more of these characteristics, may be added to one or other of the alkaline reaction components and preferably the aluminate and waterglass solutions are mixed together and then the aluminum sulfate added as described above but the procedure may be reversed. The zeolites obtained resemble the two-component aluminum double silicate type of zeolite. Three-component zeolites in which metallates and metal salt components predominate over the silicate components and which resemble non-silicious base exchange bodies can be produced from the following solutions:

(1) 5 parts of freshly precipitated $Al_2O_3$ are transformed into a corresponding potassium aluminate solution.

(2) 34 parts of aluminum sulfate with 18 mols of water are dissolved in 200 parts of water.

(3) 50 parts of 33° Bé. potassium waterglass are dissolved in 100–150 parts of water.

The diluents as described in the fore part of this example may be added to one of the components or to the mixture of the alkaline components. Preferably the aluminate and silicate components are mixed together and the aluminum sulfate is added with strong agitation. The reaction product is freed from the mother liquor and dried in the usual way. The order of reaction of the components may also be reversed.

The aluminum oxide in the metallate component may be partly or wholly substituted by one or more metallates containing vanadium, tungsten, molybdenum, lead, zinc or cadmium.

The aluminum sulfate may be partly or wholly substituted by one or more other metal salts, such as those containing vanadium, especially vanadyl sulfate, zinc, cadmium, titanium, zirconium, copper, nickel, cobalt, silver, beryllium, cerium, zinc, thorium, manganese, chromium, or iron.

The base exchange bodies are leached as described above and may or may not by themselves be catalytically active. When no catalytically active components are present in the base exchange nucleus, they may be introduced in the form of acid radicals uniting with the base exchange bodies to form salt-like bodies. The catalytic power of the leached out products may reside wholly in the zeolite or in chemical combination therewith or it may reside partly in the original zeolite and partly in diluents combined therewith to form a homogeneous structure.

Leached out zeolites may also be used as carriers for catalytic material. Examples of the introduction of catalytically active components is the introduction by base exchange. For example, part or all of the exchangeable alkali may be substituted by heavy metals, such as iron, copper, nickel, cobalt, manganese, silver, titanium, zirconium, and aluminum by trickling 5–10% solutions of the corresponding solutions over the zeolite at moderately elevated temperatures to accelerate the base exchange. Thus, just before commencing base exchange it is advantageous to hydrate the base exchange body by trickling water over it; after this treatment the base exchange bodies are caused to react with ammonium vanadate or other suitable vanadates in order to form a salt-like body. Preferably the zeolite is impregnated with a vanadate solution and the alkali washed out after reaction. The color of the zeolite changes to that of the corresponding vanadates. 1–10% solutions of the vanadates are preferred. The mass is dried and then leached with 5–10% acetic acid, followed by thorough washing, whereupon it is filled into a converter. Toluols and various nitro substituted toluols are vaporized with air in ratios such as 1:40 and passed over the contact mass at 340–420° C. producing the corresponding benzaldehydes and benzoic acids. Similarly, xylenes, pseudocumenes, mesitylenes, paracymene and other side chain organic compounds can be oxidized to the corresponding aldehydes and acids under the same conditions.

The introduction of catalytically active diluents, such as, for example, 5–10% of salts of the metal acids of the fifth and sixth groups of the periodic system enhances the catalytic power of the contact masses. Particularly effective compounds are silver vanadate, copper vanadate and iron vanadate or the corresponding tungstates, molybdates, uranates, tantalates, chromites, or their mixtures. After leaching out the catalytic power may reside partly or wholly in the diluents.

In the claims the term "permutogenetic" covers base exchange bodies, silicious or non-silicious, and the salt-like bodies obtained by the reaction of these base exchange bodies with compounds the acid radicals of which are capable of reacting with the base exchange bodies to produce products which show most of the properties of salts. Whenever used in the claims, the term "permutogenetic" will have no other meaning.

What is claimed as new is:

1. A method of oxidizing organic compounds, which comprises passing the vapors of the compounds mixed with an oxidizing gas at a reaction temperature over a catalyst which contains an acid leached permutogenetic body.

2. A method of oxidizing organic compounds, which comprises passing the vapors of the compounds mixed with an oxidizing gas at a reaction temperature over a catalyst which contains an acid leached permutogenetic body and at least one compound of an element included in the group consisting of alkali metals, alkaline earth metals and rare earth metals whose oxides are not reducible by hydrogen.

3. A method of oxidizing organic compounds, which comprises subjecting them to reaction in the vapor phase with an oxidizing gas in the presence of a catalyst which contains a diluted, acid leached permutogenetic body.

4. A method of oxidizing organic compounds, which comprises subjecting them to reaction in the vapor phase with an oxidizing gas in the presence of a catalyst which contains a diluted, acid leached permutogenetic body, at least part of the catalytically active components being chemically combined with the base exchange body.

5. A method of oxidizing organic compounds, which comprises subjecting them to reaction in the vapor phase with an oxidizing gas in the presence of a catalyst which contains a diluted, acid leached permutogenetic body, at least part of the catalytically active components being present in the diluent.

6. A method of oxidizing organic compounds, which comprises subjecting them to reaction in the vapor phase with an oxidizing gas in the presence of a catalyst containing an acid leached permutogenetic body, at least part of the catalytically active components being vanadium compounds.

7. A method of purifying mixtures of organic compounds containing readily oxidizable impurities, which comprises subjecting them to selective oxidation in the vapor phase in the presence of a catalyst containing an acid leached permutogenetic body.

8. A method of oxidizing crude anthracene of various grades of purity to anthraquinone, which comprises vaporizing it and passing the vapors admixed with an oxygen-containing gas over a catalyst containing an acid leached permutogenetic body, and which selectively catalyzes the oxidation of anthracene to anthraquinone.

9. A method of oxidizing aromatic compounds which comprises subjecting them to reaction in the vapor phase with an oxidizing gas in the presence of a catalyst which contains an acid leached permutogenetic body.

10. A method of producing oxidation products of aromatic compounds containing impurities capable of selective oxidation which comprises purifying them by selective oxidation in the vapor phase and subsequently converting them into the desired oxidation product by passing them in admixture with an oxidizing gas at a reaction temperature over a catalyst which contains an acid leached permutogenetic body.

11. A method of oxidizing aromatic compounds which comprises subjecting them to reaction in the vapor phase with an oxidizing gas in the presence of a catalyst which contains a diluted acid leached permutogenetic body.

12. A method according to claim 9, in which the catalyst contains at least one compound of an element included in the group alkali metals, alkaline earth metals, and metals whose oxides are difficulty reducible by hydrogen.

13. A method according to claim 8, in which the catalyst contains at least one compound of an element included in the group alkali metals, alkaline earth metals, and metals whose oxides are difficultly reducible by hydrogen.

14. A method according to claim 6, in which the permutogenetic body is diluted.

ALPHONS O. JAEGER.